United States Patent
Hausmann et al.

(10) Patent No.: US 8,399,082 B2
(45) Date of Patent: Mar. 19, 2013

(54) HIGH-CLARITY BLENDED IONOMER COMPOSITIONS AND ARTICLES COMPRISING THE SAME

(75) Inventors: Karlheinz Hausmann, Auvernier (CH); Richard Allen Hayes, Beaumont, TX (US); Steven C Pesek, Orange, TX (US); W Alexander Shaffer, Orange, TX (US); Charles Anthony Smith, Vienna, WV (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/486,511

(22) Filed: Jun. 1, 2012

(65) Prior Publication Data

US 2012/0237706 A1    Sep. 20, 2012

Related U.S. Application Data

(63) Continuation of application No. 12/610,710, filed on Nov. 2, 2009, now abandoned.

(60) Provisional application No. 61/141,504, filed on Dec. 30, 2008.

(51) Int. Cl.
| | |
|---|---|
| B32B 27/32 | (2006.01) |
| B32B 15/08 | (2006.01) |
| B32B 17/10 | (2006.01) |
| H01L 31/048 | (2006.01) |
| H01L 31/042 | (2006.01) |
| H01L 21/56 | (2006.01) |
| C08F 8/00 | (2006.01) |
| C08F 20/06 | (2006.01) |

(52) U.S. Cl. ....... 428/35.7; 428/220; 428/339; 428/441; 428/500; 136/251; 136/244; 136/259; 136/252; 525/196; 524/556; 526/317.1

(58) Field of Classification Search ............... 428/35.7, 428/228, 339, 441, 500; 524/556; 526/317.1
See application file for complete search history.

(56) References Cited

U.S. PATENT DOCUMENTS

| | | |
|---|---|---|
| 2,897,183 A | 7/1959 | Christl et al. |
| 3,328,367 A | 6/1967 | Rees |
| 3,344,014 A | 9/1967 | Rees |
| 3,404,134 A | 10/1968 | Rees |
| 3,471,460 A | 10/1969 | Rees |
| 3,762,988 A | 10/1973 | Clock et al. |
| 4,173,669 A | 11/1979 | Ashida et al. |
| 4,619,973 A | 10/1986 | Smith, Jr. |
| 4,663,228 A | 5/1987 | Bolton et al. |
| 4,668,574 A | 5/1987 | Bolton et al. |
| 4,714,253 A | 12/1987 | Nakahara et al. |
| 4,732,944 A | 3/1988 | Smith, Jr. |
| 4,799,346 A | 1/1989 | Bolton et al. |
| 4,857,258 A | 8/1989 | Le Doux et al. |
| 4,906,703 A | 3/1990 | Bolton et al. |
| 4,937,035 A | 6/1990 | Richter |
| 4,944,906 A | 7/1990 | Colby et al. |
| 4,968,752 A | 11/1990 | Kawamoto et al. |
| 5,002,820 A | 3/1991 | Bolton et al. |
| 5,028,674 A | 7/1991 | Hatch et al. |
| 5,094,921 A | 3/1992 | Itamura et al. |
| 5,344,513 A | 9/1994 | Takenaka |
| 5,387,635 A | 2/1995 | Rowland et al. |
| 5,428,162 A | 6/1995 | Nesvadba |
| 5,428,177 A | 6/1995 | Nesvadba |
| 5,439,227 A | 8/1995 | Egashira et al. |
| 5,452,898 A | 9/1995 | Yamagishi et al. |
| 5,476,553 A | 12/1995 | Hanoka et al. |
| 5,478,402 A | 12/1995 | Hanoka et al. |
| 5,553,852 A | 9/1996 | Higuchi et al. |
| 5,580,057 A | 12/1996 | Sullivan et al. |
| 5,733,382 A | 3/1998 | Hanoka |
| 5,741,370 A | 4/1998 | Hanoka |
| 5,752,889 A | 5/1998 | Yamagishi et al. |
| 5,759,698 A | 6/1998 | Tanuma et al. |
| 5,762,720 A | 6/1998 | Hanoka et al. |

(Continued)

FOREIGN PATENT DOCUMENTS

| | | |
|---|---|---|
| CA | 893216 A1 | 2/1972 |
| DE | 4316611 A1 | 11/1993 |

(Continued)

OTHER PUBLICATIONS

Hasch et al., "High Pressure Phase Behavior of Mixtures of Poly(Ethylene-Co-Methyl Acrylate) With Law Molecular Weight Hyrdrocarbons", Journal of Polymer Science: Part B: Polymer Physics, 1992, 1365-1373, vol. 3.

(Continued)

*Primary Examiner* — Michael M Bernshteyn
(74) *Attorney, Agent, or Firm* — Maria M. Kourtakis; Kelly Law Registry; Tong T. Li

(57) ABSTRACT

An ionomer blend composition comprises a blend of a first ionomer and a second ionomer that is different from the first ionomer. The first ionomer is derived from a first precursor acid copolymer that has a melt flow rate of about 10 to about 4000 g/10 min and that comprises copolymerized units of an α-olefin and about 20 to about 30 wt % of copolymerized units of an α,β-ethylenically unsaturated carboxylic acid. Moreover, the first precursor acid can be neutralized to a level of about 40% to about 90% to form a sodium ionomer that has a MFR of about 0.7 to about 25 g/10 min and a freeze enthalpy that is less than about 3.0 j/g or that is not detectable, when determined by differential scanning calorimetry (DSC). A variety of articles may comprise or be produced from the ionomer blend composition, for example by injection molding.

20 Claims, No Drawings

U.S. PATENT DOCUMENTS

| | | | |
|---|---|---|---|
| 5,763,062 A | 6/1998 | Smith et al. |
| 5,782,703 A | 7/1998 | Yamagishi et al. |
| 5,782,707 A | 7/1998 | Yamagishi et al. |
| 5,788,890 A | 8/1998 | Grey et al. |
| 5,803,833 A | 9/1998 | Nakamura et al. |
| 5,807,192 A | 9/1998 | Yamagishi et al. |
| 5,895,721 A | 4/1999 | Naoumenko et al. |
| 5,958,534 A | 9/1999 | Marbler et al. |
| 5,973,046 A | 10/1999 | Chen et al. |
| 5,986,203 A | 11/1999 | Hanoka et al. |
| 6,011,115 A | 1/2000 | Miharu et al. |
| 6,114,046 A | 9/2000 | Hanoka |
| 6,150,028 A | 11/2000 | Mazon |
| 6,179,732 B1 | 1/2001 | Inoue et al. |
| 6,187,448 B1 | 2/2001 | Hanoka et al. |
| 6,187,845 B1 | 2/2001 | Renz et al. |
| 6,191,199 B1 | 2/2001 | Renz et al. |
| 6,207,761 B1 | 3/2001 | Smith et al. |
| 6,238,801 B1 | 5/2001 | Naoumenko et al. |
| 6,245,915 B1 | 6/2001 | Wood et al. |
| 6,265,054 B1 | 7/2001 | Bravet et al. |
| 6,268,415 B1 | 7/2001 | Renz et al. |
| 6,319,596 B1 | 11/2001 | Kernander et al. |
| 6,320,116 B1 | 11/2001 | Hanoka |
| 6,353,042 B1 | 3/2002 | Hanoka et al. |
| 6,432,522 B1 | 8/2002 | Friedman et al. |
| 6,455,161 B1 * | 9/2002 | Regnier et al. ............. 428/412 |
| 6,500,888 B2 | 12/2002 | Baumgartner et al. |
| 6,518,365 B1 | 2/2003 | Powell et al. |
| 6,586,271 B2 | 7/2003 | Hanoka |
| 6,690,930 B1 | 2/2004 | Dupre |
| 6,699,027 B2 | 3/2004 | Murphy et al. |
| 6,737,151 B1 | 5/2004 | Smith |
| 6,852,792 B1 | 2/2005 | Capendale et al. |
| 6,866,158 B1 | 3/2005 | Sommer et al. |
| 7,005,098 B2 | 2/2006 | Cavallaro et al. |
| 7,128,864 B2 | 10/2006 | Kennedy, III et al. |
| 7,189,457 B2 | 3/2007 | Anderson |
| 7,201,672 B2 | 4/2007 | Yamagishi et al. |
| 7,763,360 B2 | 7/2010 | Paul et al. |
| 7,951,865 B1 | 5/2011 | Paul et al. |
| 2002/0155302 A1 | 10/2002 | Smith et al. |
| 2002/0175136 A1 | 11/2002 | Bouix et al. |
| 2002/0180083 A1 | 12/2002 | Yaniger |
| 2003/0000568 A1 | 1/2003 | Gonsiorawski |
| 2003/0044579 A1 | 3/2003 | Bolton et al. |
| 2003/0124296 A1 | 7/2003 | Smith |
| 2004/0011755 A1 | 1/2004 | Wood |
| 2004/0144415 A1 | 7/2004 | Arhart |
| 2004/0176531 A1 | 9/2004 | Morgan et al. |
| 2005/0058498 A1 | 3/2005 | Botto et al. |
| 2005/0129888 A1 | 6/2005 | Kwon |
| 2005/0279401 A1 | 12/2005 | Arhart et al. |
| 2006/0043632 A1 | 3/2006 | Anderson |
| 2006/0057392 A1 | 3/2006 | Smillie et al. |
| 2006/0084763 A1 | 4/2006 | Arhart et al. |
| 2006/0141212 A1 | 6/2006 | Smith et al. |
| 2006/0165929 A1 | 7/2006 | Lenges et al. |
| 2006/0182983 A1 | 8/2006 | Paul et al. |
| 2006/0273485 A1 | 12/2006 | Higuchi et al. |
| 2007/0122633 A1 * | 5/2007 | Pesek et al. .................... 428/442 |
| 2007/0221268 A1 | 9/2007 | Hasch |
| 2007/0282069 A1 | 12/2007 | Egashira et al. |
| 2007/0289693 A1 * | 12/2007 | Anderson et al. ............. 156/99 |
| 2008/0017241 A1 | 1/2008 | Anderson et al. |
| 2008/0023063 A1 | 1/2008 | Hayes et al. |
| 2008/0023064 A1 | 1/2008 | Hayes et al. |
| 2008/0044666 A1 | 2/2008 | Anderson et al. |
| 2008/0058465 A1 * | 3/2008 | Chen ............................. 524/556 |
| 2008/0269388 A1 | 10/2008 | Markovich et al. |
| 2009/0023867 A1 | 1/2009 | Nishijima et al. |
| 2009/0120489 A1 | 5/2009 | Nishijima et al. |
| 2009/0297747 A1 | 12/2009 | Hausmann et al. |

FOREIGN PATENT DOCUMENTS

| | | |
|---|---|---|
| DE | 4316622 A1 | 11/1993 |
| DE | 4316876 A1 | 11/1993 |
| EP | 0157030 A1 | 10/1985 |
| EP | 0483087 A1 | 4/1991 |
| EP | 0589839 B1 | 9/1993 |
| EP | 0591102 B1 | 9/1993 |
| EP | 0855155 B1 | 12/1996 |
| EP | 1816147 A1 | 11/2005 |
| JP | 1981116047 A | 11/1981 |
| JP | 1990094574 A | 5/1990 |
| JP | 1991510646 B2 | 11/1994 |
| JP | 1994322334 A | 11/1994 |
| JP | 1996316508 A | 11/1996 |
| JP | 1999026791 A | 1/1999 |
| JP | 2000186114 A | 7/2000 |
| JP | 2001031801 A | 2/2001 |
| JP | 2001089616 A | 4/2001 |
| JP | 2001119047 A | 4/2001 |
| JP | 2001119056 A | 4/2001 |
| JP | 2001119057 A | 4/2001 |
| JP | 2001144313 A | 5/2001 |
| JP | 2004031445 A | 1/2004 |
| JP | 2005064268 A | 3/2005 |
| JP | 2006032308 A | 2/2006 |
| JP | 2006036874 A | 2/2006 |
| JP | 2006036875 A | 2/2006 |
| JP | 2006036876 A | 2/2006 |
| JP | 2006186237 A | 7/2006 |
| JP | 2006190865 A | 7/2006 |
| JP | 2006190867 A | 7/2006 |
| WO | 9904971 A2 | 2/1999 |
| WO | 9958334 A2 | 11/1999 |
| WO | 0063309 A1 | 10/2000 |
| WO | 0064670 A1 | 11/2000 |
| WO | 02051916 A2 | 7/2002 |
| WO | 03045186 A1 | 6/2003 |
| WO | 2004011755 A1 | 2/2004 |
| WO | 2004062881 A1 | 7/2004 |
| WO | 2006002389 A1 | 1/2006 |
| WO | 2006057771 A2 | 6/2006 |
| WO | 2006085603 A1 | 8/2006 |
| WO | 2006095762 A1 | 9/2006 |
| WO | 2008010597 A1 | 1/2008 |

OTHER PUBLICATIONS

Suh et al., Charge Behavior in Polyethylene-Ionomer Blends, IEEE Transactions on Dielectrics and Electrical Insulation, 1997, pp. 58-63, vol. 4, No. 1, IEEE Service Center, Piscataway, NJ, US.

PCT International Search Report and Written Opinion for International Application No. PCT/US09/62940, Filed Nov. 2, 2009, Dated Dec. 24, 2009.

PCT International Preliminary Report on Patentability for International Application No. PCT/US09/62940, Dated Jun. 21, 2011.

ASTM International Designation D 3418-99, Standard Test Method for Transition Temperatures of Polymers by Differential Scanning Calorimetry, 1999.

ASTM International Designation D3418-03, Standard Test Method for Transition Temperatures and Enthalpies of Fusion and Crystallization of Polymers by Differential Scanning Calorimetry, 2003.

ASTM International Designation D3418-08, Standard Test Method for Transition Temperatues and Enthalpies of Fusion and Crystallization of Polymers by Differential Scanning Calorimetry, 2008.

ASTM International Designation D3417-99, Standard Test Method for Enthalpies of Fusion and Crystallization of Polymers by Differential Scanning Calorimetry (DSC), 1999.

* cited by examiner

HIGH-CLARITY BLENDED IONOMER COMPOSITIONS AND ARTICLES COMPRISING THE SAME

CROSS-REFERENCE TO RELATED APPLICATIONS

The present application is a continuation of U.S. application Ser. No. 12/610,710, filed on Nov. 2, 2009, now abandoned, which in turn claims priority to U.S. Provisional Application No. 61/141,504, filed on Dec. 30, 2008, each of which is incorporated herein by reference in its entirety.

FIELD OF THE INVENTION

The present invention relates to ionomer compositions and to articles, for example injection molded articles, made from the ionomer compositions.

BACKGROUND OF THE INVENTION

Several patents and publications are cited in this description in order to more fully describe the state of the art to which this invention pertains. The entire disclosure of each of these patents and publications is incorporated by reference herein.

Ionomers are copolymers produced by partially or fully neutralizing the carboxylic acid groups of precursor or parent polymers that are acid copolymers comprising copolymerized residues of $\alpha$-olefins and $\alpha,\beta$-ethylenically unsaturated carboxylic acids. A variety of articles made from ionomers by injection molding processes have been used in our daily life.

For example, golf balls with ionomer covers have been produced by injection molding. See, e.g.; U.S. Pat. Nos. 4,714,253; 5,439,227; 5,452,898; 5,553,852; 5,752,889; 5,782,703; 5,782,707; 5,803,833; 5,807,192; 6,179,732; 6,699,027; 7,005,098; 7,128,864; 7,201,672; and U.S. Patent Appln. Publn. Nos. 2006/0043632; 2006/0273485; and 2007/0282069.

Ionomers have also been used to produce injection molded hollow articles, such as containers. See, e.g. U.S. Pat. Nos. 4,857,258; 4,937,035; 4,944,906; 5,094,921; 5,788,890; 6,207,761; and 6,866,158, U.S. Patent Publication Nos. 20020180083; 20020175136; and 20050129888, European Patent Nos. EP1816147 and EP0855155, and PCT Patent Publn. Nos. WO2004062881; WO2008010597; and WO2003045186.

Containers produced by injection molding often have thick wall structures. When ionomers are used in forming such injection molded containers, the optical properties may suffer due to the thickness of the wall. There is a need, especially in the cosmetics industry, to develop containers that are made of ionomer compositions and that have improved optical properties.

SUMMARY OF THE INVENTION

Accordingly, provided herein is a composition comprising an ionomer blend. The ionomer blend comprises about 5 to about 95 wt % of a first ionomer and about 95 to about 5 wt % of a second ionomer, based on the total weight of the ionomer blend. In addition, the ionomer blend has a neutralization level of 10% to 90%, based on the total number of neutralized and unneutralized carboxylic acid groups in the ionomer blend.

The first ionomer is the neutralization product of a first precursor acid copolymer that comprises copolymerized units of a first $\alpha$-olefin having 2 to 10 carbon atoms and about 20 to about 30 wt %, based on the total weight of the first precursor acid copolymer, of copolymerized units of a first $\alpha,\beta$-ethylenically unsaturated carboxylic acid having 3 to 8 carbon atoms. The first precursor acid copolymer also has a melt flow rate of about 70 to about 1000 g/10 min. When neutralized to a level of about 40% to about 90% and when comprising cations that consist essentially of sodium cations, the first precursor acid copolymer produces a sodium ionomer. The sodium ionomer has a melt flow rate (MFR) of about 0.7 to about 25 g/10 min and a freeze enthalpy that is not detectable or that is less than about 3.0 j/g, when determined by differential scanning calorimetry (DSC) in accordance with ASTM D3418.

The second ionomer is the neutralization product of a second precursor acid copolymer that is different from the first precursor acid copolymer. The second precursor acid copolymer comprises copolymerized units of a second $\alpha$-olefin having 2 to 10 carbon atoms and about 18 to about 30 wt %, based on the total weight of the second precursor acid copolymer, of copolymerized units of a second $\alpha,\beta$-ethylenically unsaturated carboxylic acid having 3 to 8 carbon atoms. The second $\alpha$-olefin may be the same as or different from the first $\alpha$-olefin, and the second $\alpha,\beta$-ethylenically unsaturated carboxylic acid may be the same as or different from the first $\alpha,\beta$-ethylenically unsaturated carboxylic acid. Likewise, the amount of the second $\alpha$-olefin or the second $\alpha,\beta$-ethylenically unsaturated carboxylic acid may be the same as or different from the amounts of the first $\alpha$-olefin or the first $\alpha,\beta$-ethylenically unsaturated carboxylic acid. The second precursor acid copolymer has a melt flow rate of about 60 g/10 min or less, and the second ionomer has a melt flow rate of about 10 g/10 min or less at the neutralization level of the ionomer blend. The second ionomer has a melt flow rate at the neutralization level of the ionomer blend that is different from the melt flow rate of the first ionomer at the same neutralization level.

Further provided are articles, such as injection-molded articles, comprising or produced from the composition.

DETAILED DESCRIPTION OF THE INVENTION

The following definitions apply to the terms as used throughout this specification, unless otherwise limited in specific instances.

The technical and scientific terms used herein have the meanings that are commonly understood by one of ordinary skill in the art to which this invention belongs. In case of conflict, the present specification, including the definitions herein, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A 'consisting essentially of' claim occupies a middle ground between closed claims that are written in a 'consisting of' format and fully open claims that are drafted in a 'comprising' format. Optional additives as defined herein, at a level that is appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios, and like amounts, are defined by weight.

Unless otherwise specified under limited circumstances, all melt flow rates are measured according to ASTM method D1238 at a polymer melt temperature of 190° C. and under a weight of 2.16 kg. Moreover, the terms melt flow rate (MFR), melt flow index (MFI) and melt index (MI) are synonymous and used interchangeably herein.

The terms "freeze enthalpy", "heat of crystallization" and "enthalpy of crystallization", as used herein, are synonymous and interchangeable. The terms "heat of crystallization" and "enthalpy of crystallization" are defined in ASTM Method No. D3418, published in December, 2008.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers consisting essentially of three monomers.

The term "acid copolymer" as used herein refers to a polymer comprising copolymerized units of an α-olefin, an α,β-ethylenically unsaturated carboxylic acid, and optionally other suitable comonomer(s) such as, an α,β-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "blend", as used herein, is synonymous with the term "combination". Specifically, unless otherwise specified in particular circumstances, the term "blend" carries no implications with respect to the morphology of the compositions to which it refers.

Finally, the term "ionomer" as used herein refers to a polymer that comprises ionic groups that are carboxylate salts, for example, ammonium carboxylates, alkali metal carboxylates, alkaline earth carboxylates, transition metal carboxylates and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a zinc/sodium mixed ionomer (or zinc/sodium neutralized mixed ionomer), for example a copolymer of ethylene and methacrylic acid wherein all or a portion of the carboxylic acid groups of the copolymerized methacrylic acid units are in the form of zinc carboxylates and sodium carboxylates.

Provided herein is a composition that comprises or is made from an ionomer blend. The ionomer blend comprises a first ionomer and a second ionomer. The ionomer blend may comprise about 5 to about 95 wt % of the first ionomer and about 5 to about 95 wt % of the second ionomer, or about 60 to about 95 wt % of the first ionomer and about 5 to about 40 wt % of the second ionomer, or about 70 to about 90 wt % of the first ionomer and about 10 to about 30 wt % of the second ionomer, or about 70 to about 80 wt % of the first ionomer and about 20 to about 30 wt % of the second ionomer, based on the total weight of the ionomer blend.

The first ionomer is an ionic, neutralized derivative of a first precursor acid copolymer comprising copolymerized units of an α-olefin having 2 to 10 carbon atoms and copolymerized units of an α,β-ethylenically unsaturated carboxylic acid having 3 to 8 carbon atoms. Preferably, the precursor acid copolymer comprises about 20 to about 30 wt %, or about 20 to about 25 wt %, based on the total weight of the precursor acid copolymer, of the copolymerized carboxylic acid. The amount of copolymerized α-olefin is complementary to the amount of copolymerized carboxylic acid and other comonomers, if present, so that the sum of the weight percentages of the comonomers in the precursor acid copolymer is 100 wt %.

The first precursor acid copolymer may have a melt flow rate (MFR) of about 70 to about 1000 g/10 min, or about 100 to about 500 g/10 min, or about 150 to about 400 g/10 min, or about 200 to about 350 g/10 min, as determined in accordance with ASTM method D1238 at a polymer melt temperature of 190° C. and under a weight of 2.16 kg.

Further, when the carboxylate groups of the first precursor acid copolymer have been neutralized to a level of about 40% to about 90% and its counterions consist essentially of sodium cations, a sodium ionomer is produced. This sodium ionomer has a freeze enthalpy that is not detectable or that is less than about 3 j/g, or less than about 2 j/g, as determined by differential scanning calorimetry (DSC) in accordance with ASTM method D3418 when using a DSC apparatus manufactured by Mettler or by TA (for example the Universal V3.9A model). The term "not detectable", as used in this context, refers to a freeze enthalpy that produces no observable inflection in the DSC curve. Alternatively, the peak height may be very small and the peak width at half height may be relatively great, so that a broad peak having a small integral area may not be detectable or discernable when a baseline is subtracted from the DSC trace. In general, when ASTM D3418 is followed, a freeze enthalpy that falls below 0.2 j/g is not detectable.

The second ionomer in the blend composition is an ionic, neutralized derivative of a second precursor acid copolymer comprising copolymerized units of an α-olefin having 2 to 10 carbon atoms and about 18 to about 30 wt %, or about 20 to about 25 wt %, or about 21 to about 24 wt % of copolymerized units of an α,β-ethylenically unsaturated carboxylic acid having 3 to 8 carbon atoms. The α-olefin or the α,β-ethylenically unsaturated carboxylic acid of the second precursor acid copolymer may, independently, be the same as or different from the α-olefin or the α,β-ethylenically unsaturated carboxylic acid of the first precursor acid copolymer. Likewise, the amount of copolymerized units of the α-olefin or of the α,β-ethylenically unsaturated carboxylic acid of the second precursor acid copolymer may, independently, be the same as or different from the amount of copolymerized units of the α-olefin or of the α,β-ethylenically unsaturated carboxylic acid of the first precursor acid copolymer. In addition, the second precursor acid copolymer has a melt flow rate (MFR) that that may be in the range of about 60 g/10 min or less, or about 45 g/10 min or less, or about 30 g/10 min or less, or about 25 g/10 min or less, as determined in accordance with ASTM method D1238 at 190° C. and 2.16 kg.

To obtain the second ionomer used in the blend composition, the second precursor acid copolymer may be neutralized with one or more cation-containing bases to provide an ionomer wherein about 10% to about 35%, or about 15% to about 30% of the hydrogen atoms of carboxylic acid groups of the second precursor acid copolymer are replaced by cations, preferably metal cations. That is, the acid groups are neutralized to a level of about 10% to about 35%, or about 15% to about 30%, based on the total carboxylic acid content of the second precursor acid copolymer as calculated or as measured for the non-neutralized second precursor acid copolymer. The thus-obtained second ionomer has a MFR of about 10 g/10 min or less, or about 5 g/10 min or less, or about 3 g/10 min or less, as determined in accordance with ASTM method D1238 at 190° C. and 2.16 kg. Those of skill in the art are aware, however, that the neutralization levels of two ionomers in a blend will equilibrate over time to a shared neutralization level that is determined by the total number of acid and base equivalents in the ionomer blend. The second ionomer has a MFR, at the neutralization level of the ionomer blend, that is different from the MFR of the first ionomer at the same neutralization level.

Suitable α-olefin comonomers comprised in the first and second precursor acid copolymers include, but are not limited to, ethylene, propylene, 1-butene, 1-pentene, 1-hexene, 1-heptene, 3 methyl-1-butene, 4-methyl-1-pentene, and the like and combinations of two or more thereof. Preferably, the α-olefin is ethylene.

Suitable α,β-ethylenically unsaturated carboxylic acid comonomers for use in the first and second precursor acid copolymers include, but are not limited to, acrylic acids, methacrylic acids, itaconic acids, maleic acids, maleic anhydride, fumaric acids, monomethyl maleic acids, and combinations of two or more thereof. Preferably, the α,β-ethylenically unsaturated carboxylic acid is selected from acrylic acids, methacrylic acids, and combinations of two or more thereof.

Each of the first and second precursor acid copolymers may independently further comprise copolymerized units of other comonomer(s), such as unsaturated carboxylic acids having 2 to 10 carbon atoms or 3 to 8 carbon atoms, or derivatives thereof. Again, the presence or absence of other comonomers, the identity of the other comonomers, and the amounts of the other comonomers may be the same or different and are independently selected for the first and second precursor acid copolymers. Suitable acid derivatives include acid anhydrides, amides, and esters. Some suitable precursor acid copolymers further comprise an ester of the unsaturated carboxylic acid. Examples of suitable esters of unsaturated carboxylic acids include, but are not limited to, those that are set forth in U.S. Patent Appln. Publn. No. 2010/00112253. Examples of preferred comonomers include, but are not limited to, methyl (meth)acrylates, butyl (meth)acrylates, glycidyl methacrylates, vinyl acetates, and combinations of two or more thereof. In one preferred ionomer blend, the first or second precursor acid copolymer does not incorporate other comonomers.

To obtain the ionomers useful in the ionomer compositions described herein, the precursor acid copolymers are neutralized with a base so that the carboxylic acid groups in the precursor acid copolymer react to form carboxylate groups. Preferably, the precursor acid copolymers are neutralized to a level of about 20 to about 90%, or about 30% to about 90%, or about 35% to about 90%, or about 40% to about 90%, or about 40% to about 70%, or about 43% to about 60%, based on the total carboxylic acid content of the precursor acid copolymers as calculated or as measured for the non-neutralized precursor acid copolymers.

Any stable cation and any combination of two or more stable cations are believed to be suitable as counterions to the carboxylate groups in the first and second ionomers. For example, divalent and monovalent cations, such as cations of alkali metals, alkaline earth metals, and some transition metals, may be used. In one preferred ionomer blend, divalent ions such as zinc cations, are used. In another preferred ionomer blend, monovalent cations, such as sodium cations, are used. In yet another preferred ionomer blend, the ion-containing base used to obtain the first or second ionomer is a sodium ion-containing base.

The first and second precursor acid copolymers may be synthesized by methods that are described in detail in U.S. Patent Appln. Publn. No. 2010/00112253, cited above. In general, to obtain the first and second ionomers described herein, during the polymerization reaction, the reactor contents should be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Preferred examples for the first precursor acid copolymer are synthesized under conditions that are well within the single-phase region. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low-Molecular Weight Hydrocarbons", Journal of Polymer Science Part B: Polymer Physics, Vol. 30, 1365-1373 (1992), describe a cloud-point measurement that can be used in determining the boundary between single-phase and multiphase conditions.

To obtain the first and second ionomers used in the blend composition, each of the first and second precursor acid copolymers may be neutralized by any conventional procedure, such as those described in U.S. Patent Nos. 3,404,134 and 6,518,365. The ionomer blend may be obtained by combining or blending the first and second ionomers. Other methods of obtaining the ionomer blend will be apparent to those of ordinary skill in the art. For example, the first and second precursor acid copolymers may be blended prior to neutralization to the desired level. In an alternative example, other ionomers derived from the first and second precursor acid copolymers may be blended, or one ionomer and one precursor acid copolymer may be blended, and the neutralization level of this intermediate blend may be adjusted upwards or downwards to the desired level for the ionomer blend.

The ionomer blend may be neutralized to any level between 0.01% and 100.00% that does not result in an intractable product, that is, one that is not processable in the melt. Preferably, the ionomer blend is neutralized to a level of 10% to 90%, 15% to 90%, 10% to 70%, 15% to 70%, 10% to 60%, or 15% to 60%. The melt flow rate of the ionomer blend is expected to be within the range defined by the melt flow rates of the first and second ionomer at the neutralization level of the blend.

The ionomer blend composition described herein may further contain any suitable additive known in the art. Such additives include, but are not limited to, plasticizers, processing aides, flow enhancing additives, flow reducing additives (e.g., organic peroxides), lubricants, pigments, dyes, optical brighteners, flame retardants, impact modifiers, nucleating agents, antiblocking agents (e.g., silica), thermal stabilizers, hindered amine light stabilizers (HALS), UV absorbers, UV stabilizers, dispersants, surfactants, chelating agents, coupling agents, adhesives, primers, reinforcement additives (e.g., glass fiber), fillers, and the like, and mixtures or combinations of two or more conventional additives. These additives are described in the *Kirk Othmer Encyclopedia of Chemical Technology*, 5$^{th}$ Edition, John Wiley & Sons (New Jersey, 2004), for example.

These conventional ingredients may be present in the compositions in quantities that are generally from 0.01 to 15 weight %, preferably from 0.01 to 10 weight %, so long as they do not detract from the basic and novel characteristics of the composition and do not significantly adversely affect the performance of the composition or of the articles prepared from the composition. In this connection, the weight percentages of such additives are not included in the total weight percentages of the thermoplastic compositions defined herein. Typically, many such additives may be present in from 0.01 to 5 weight %, based on the total weight of the ionomer composition.

The optional incorporation of such conventional ingredients into the compositions can be carried out by any known process. This incorporation can be carried out, for example, by dry blending, by extruding a mixture of the various constituents, by a masterbatch technique, or the like. See, again, the *Kirk-Othmer Encyclopedia*. Three notable additives are thermal stabilizers, UV absorbers, and hindered amine light stabilizers. These additives are described in detail in U.S. Patent Appln. Publn. No. 2010/0166992.

Further provided are articles comprising the ionomer blend composition described herein. The first ionomer used in the blend composition, as described in U.S. Patent Appln. Publn. No. 2010/00112253, cited above, can be used to form an article, such as a film or sheet or a molded article, with improved optical properties. It was surprisingly found that the improved optical properties are not affected by the cooling rate under which the article was obtained. As the first precursor acid copolymer has a relatively high MFR (about 70 to about 1000 g/10 min), however, the toughness of the first ionomer may be insufficient for some end uses. By blending the first ionomer with the second ionomer, which is derived from a second precursor acid copolymer having a relatively lower MFR (about 60 g/10 min or lower), the ionomer blend composition has an improved level of toughness compared to the first ionomer.

In addition, the haze level of a polymer blend is often higher than that of any of the polymer components in the blend. It is therefore expected that the ionomer blend composition described herein will have a haze level that is higher than those of the first and second ionomers. Also surprisingly, however, the ionomer blend described herein has a haze level that is lower than that of the second ionomer. Moreover, the ionomer blend may exhibit a haze level that is lower than that of either the first or the second ionomer.

Returning now to the description of the article provided herein, this article may be in any shape or form, such as a film or sheet or a molded article.

The article may be a film or sheet, which may be prepared by any conventional process, such as, dipcoating, solution casting, lamination, melt extrusion, blown film, extrusion coating, tandem extrusion coating, or by any other procedures that are known to those of skill in the art. The films or sheets are preferably formed by melt extrusion, melt coextrusion, melt extrusion coating, blown film, or by a tandem melt extrusion coating process.

Alternatively, the articles comprising the ionomer blend compositions described herein are molded articles, which may be prepared by any conventional molding process, such as, compression molding, injection molding, extrusion molding, blow molding, injection blow molding, injection stretch blow molding, extrusion blow molding and the like. Articles may also be formed by combinations of two or more of these processes, such as for example when a core formed by compression molding is overmolded by injection molding.

Information about these fabrication methods may be found in reference texts such as, for example, the *Kirk Othmer Encyclopedia*, the *Modern Plastics Encyclopedia*, McGraw-Hill (New York, 1995) or the Wiley *Encyclopedia of Packaging Technology*, 2d edition, A. L. Brody and K. S. Marsh, Eds., Wiley-Interscience (Hoboken, 1997).

In another alternative, the article comprising the ionomer blend composition described herein is an injection molded article having a minimum thickness (i.e, the thickness at the smallest dimension of the article) of at least about 1 mm. Preferably, the injection molded article may have a thickness of about 1 mm to 100 mm, or 2 mm to 100 mm, or 3 to about 100 mm, or about 3 to about 50 mm, or about 5 to about 35 mm.

In yet another alternative, the article is an injection molded article in the form of a multi-layer structure (such as an over-molded article), wherein at least one layer of the multi-layer structure comprises or consists essentially of the ionomer composition described above and that layer has a minimum thickness of at least about 1 mm. Preferably, the at least one layer of the multi-layer article has a thickness of about 1 mm to 100 mm, or 2 mm to 100 mm, or 3 to about 100 mm, or about 3 to about 50 mm, or about 5 to about 35 mm.

In yet another alternative, the article is an injection molded article in the form of a sheet, a container (e.g., a bottle or a bowl), a cap or stopper (e.g. for a container), a tray, a medical device or instrument (e.g., an automated or portable defibrillator unit), a handle, a knob, a push button, a decorative article, a panel, a console box, or a footwear component (e.g., a heel counter, a toe puff, or a sole).

In yet another alternative, the article is an injection molded intermediate article for use in further shaping processes. For example, the article may be a pre-form or a parison suitable for use in a blow molding process to form a container (e.g., a cosmetic container). The injection molded intermediate article may be in the form of a multi-layer structure such as the one described above, and it may therefore produce a container having a multi-layer wall structure.

Injection molding is a well-known molding process. When the article described herein is in the form of an injection molded article, it may be produced by any suitable injection molding process. Suitable injection molding processes include, for example, co-injection molding and over-molding. These processes are sometimes also referred to as two-shot or multi-shot molding processes.

When the injection molded article is produced by an over-molding process, the ionomer composition may be used as the substrate material, the over-mold material or both. In certain articles, when an over-molding process is used, the ionomer composition described herein may be over-molded on a glass, plastic or metal container. Alternatively, the ionomer compositions may be over-molded on any other articles (such as household items, medical devices or instruments, electronic devices, automobile parts, architectural structures, sporting goods, etc.) to form a soft touch and/or protective overcoating. When the over-mold material comprises the ionomer composition described herein, the melt index of the ionomer is preferably from 0.75 up to about 35 g/10 min, as determined in accordance with ASTM D1238 at 190° C. and 2.16 kg.

In fabrication processes that incorporate a form of blow molding, such as, for example, injection blow molding, injection stretch blow molding and extrusion blow molding, and in substrates or monolayer articles that comprise the ionomer composition, the ionomer composition preferably comprises an ionomer having zinc cations. When the overmolding material comprises the ionomer composition, however, the ionomer may comprise any suitable cation. Also preferably, the precursor acid copolymer preferably has a melt index of 200 to 500 g/10 min, as determined in accordance with ASTM D1238 at 190° C. and 2.16 kg. In addition, the ionomer preferably has a melt index of from about 0.1 to about 2.0 g/10 min or from about 0.1 to about 35 g/10 min, as determined in accordance with ASTM D1238 at 190° C. and 2.16 kg. More specifically, when the substrate comprises the ionomer, the ionomer preferably has a melt index of about 0.5 to about 4 g/10 min. When the overmolding material comprises the ionomer, however, the ionomer preferably has a melt index of from 0.1 g/10 min or 0.75 g/10 min or 4.0 g/10 min or 5 g/10 min up to about 35 g/10 min.

The ionomer blend composition may be molded at a melt temperature of about 120° C. to about 250° C., or about 130° C. to about 210° C. In general, slow to moderate fill rates with pressures of about 69 to about 110 MPa may be used. The mold temperatures may be in the range of about 5° C. to about 50° C., preferably 5° C. to 20° C., and more preferably 5° C. to 15° C. Based on the ionomer blend composition and the process type that is to be used, one skilled in the art would be able to determine the proper molding conditions required to produce a particular type of article.

The following examples are provided to describe the invention in further detail. These examples, which set forth a preferred mode presently contemplated for carrying out the invention, are intended to illustrate and not to limit the invention.

EXAMPLES

Examples E1 to E3 and Comparative Examples CE1 and CE2

In the following examples, two ionomer resins (ION A and ION B) and blends thereof were formed into polymer sheets, which were in turn used in forming laminates.

Specifically, ION A was a copolymer of ethylene and methacrylic acid containing 21.7 wt % of copolymerized units of methacrylic acid that was 26% neutralized with a sodium ion-containing base and had a MFR of 1.8 g/10 min (as determined in accordance with ASTM D1238 at 190° C. and 2.16 kg). The MFR of the precursor ethylene methacrylic acid copolymer of ION A, prior to neutralization, was 23 g/10 min (190° C. and 2.16 kg). ION B was a copolymer of ethylene and methacrylic acid containing 21.7 wt % of copolymerized units of methacrylic acid that was 53% neutralized with a sodium ion-containing base and had a MFR of 2.5 g/10 min (190° C. and 2.16 kg). The MFR of the precursor ethylene methacrylic acid copolymer of ION B, prior to neutralization, was 350 g/10 min (190° C. and 2.16 kg).

In preparing each of the two ionomer resins, ION A and ION B, the precursor acid copolymer was produced by free radical polymerization in an adiabatic continuously stirred autoclave, substantially according to the procedure described in Example 1 of U.S. Pat. No. 5,028,674 with the following exceptions: (1) by controlling the ratio of ethylene to methacrylic acid and the flow rate of the initiator, the reactor conditions were maintained at a temperature of about 200° C. to about 260° C. and at a pressure of between 170 and 240 MPa; (2) no propane telogen was fed in the reactor; (3) the total concentration of methanol in the reactor was maintained at about 2 to 5 mol %, based on the total feed of ethylene, methacrylic acid, methanol and initiator solution; and (4) the system was maintained at a steady state with the residence time of the material flowing through the reactor being about 5 seconds to 2 minutes. In addition, depending on the particular acid copolymer to be synthesized, one of two different free-radical initiators were used, tert-butyl peracetate or tert-butyl peroctoate. When tert-butyl peracetate was the initiator (as in preparing the precursor acid copolymer for ION B), it was utilized as a solution in odorless mineral spirits at 50% concentration. When tert-butyl perocotate was the initiator (as in preparing the precursor acid copolymer for ION A), it was utilized as a mixture at 90% concentration in odorless mineral spirits. The ionomers were obtained by partially neutralizing the precursor copolymers of ethylene and methacrylic acid with sodium hydroxide solution either in a single screw extruder under high shear melt mixing conditions with the melt temperature set at 200° C. to 270° C., or using the general method described in Example 1 of U.S. Pat. No. 6,518,365.

Further, each of the ionomers or blends of ionomers was fed into 25 mm diameter Killion extruders under the temperature profile set forth in Table 1, then cast by extrusion into polymer sheets. The polymer throughput was controlled by adjusting the screw speed to maximum throughput, a 150 mm slot die with a nominal gap of 2 mm was fed by the extruder, and the cast sheet was fed onto a 200 mm diameter polished chrome chill roll held at a temperature of between 10° C. and 15° C. and rotating at 1 to 2 rpm. The nominally 0.76 mm (30 mil) thick sheets were then removed and cut into 300×300 mm squares.

These ionomer sheets were used as interlayer sheets to form glass laminates. Annealed glass sheets (100×100×3 mm) were washed with a solution of trisodium phosphate (5 g/l) in de-ionized water at 50° C. for 5 min, then rinsed thoroughly with de-ionized water and dried. Three sheets of each ionomer (about 0.76 mm thick) were stacked together and placed between the two glass sheets to form a pre-lamination assembly having an interlayer with a total thickness of about 180 mils (2.28 mm). The moisture level of the ionomer sheets was kept below 0.06 wt % by minimizing their exposure to ambient conditions (approximately 35% RH). The pre-lamination assembly was stabilized by the application of polyester tape in several locations to maintain relative positioning of each layer with the glass sheets. A nylon fabric strip was placed around the periphery of the assembly to facilitate air removal from within the layers.

The pre-lamination assembly was placed inside a nylon vacuum bag and sealed. A connection was made to a vacuum pump, and the air within the bagged assembly was substantially removed by reducing the air pressure inside the bag was reduced to below 50 millibar absolute. The bagged assembly was then heated in a convection air oven to 120° C. and maintained at these conditions for 30 min. A cooling fan was used to cool the assembly to near ambient temperature, after which the vacuum source was disconnected and the bag was removed, yielding a fully pre-pressed assembly of glass and interlayer. Although hermetically sealed around the periphery, several areas of the assembly were not fully bonded as indicated by the presence of bubbles in these areas.

The pre-pressed assembly was placed into an air autoclave and the temperature and pressure were increased from ambient to 135° C. and 13.8 bar over 15 min. The assembly was maintained at these conditions for 30 min, after which the resulting laminate was rapidly cooled (i.e., at Cooling Rate A of 2.5° C./min) to room temperature at ambient pressure. The thus-obtained laminate was tested for haze in accordance with ASTM D1003 using a Haze-gard Plus hazemeter (BYK-Gardner, Columbia, Md.). After this measurement, the same laminate was heated to 120° C. in an oven and maintained at such temperature for 2 to 3 hours before it was slowly cooled (i.e., at Cooling Rate B of 0.1° C./min) to room temperature and then tested for haze again. The haze results are reported in Table 2, below.

TABLE 1

| Extruder Zone | Temperature (° C.) |
|---|---|
| Feed | Ambient |
| Zone 1 | 100-170 |
| Zone 2 | 150-210 |
| Zone 3 | 170-230 |
| Adapter | 170-230 |
| Die | 170-230 |

TABLE 2

| Sample No. | Ionomer Component ION A (wt %) | Ionomer Component ION B (wt %) | Neutralization Level (%) | MFR (g/10 min) | Haze (%) Cooling Rate A | Haze (%) Cooling Rate B |
|---|---|---|---|---|---|---|
| CE1 | 100 | 0 | 26 | 1.8 | 1.05 | 6.64 |
| E1 | 80 | 20 | 31 | 2.2* | 0.83 | 5.9 |
| E2 | 45 | 55 | 41 | 2.3* | 0.67 | 0.88 |
| E3 | 25 | 75 | 46 | 2.4* | 0.62 | 0.49 |
| CE2 | 0 | 100 | 53 | 2.5 | 0.58 | 0.57 |

*The MFR of the blends was calculated as a weighted ratio of the MFR of ION A and of ION B.

Examples E4 to E7 and Comparative Example CE3

In each of Examples E4 to E7 and Comparative Example CE3, a ballistic resistant laminate having the dimensions of 500×500 mm was prepared with the component laminate layers listed in Table 3. First, the component layers of each laminate were stacked to form a pre-lamination assembly. The pre-lamination assembly also included a glass cover sheet placed over the PET film layer in each of Examples E4 to E7 or the polycarbonate sheet layer in Comparative Example CE3. The pre-lamination assembly was then placed in a vacuum bag, which was sealed. A vacuum was applied to remove the air from the vacuum bag and to remove any air contained between the assembly layers. The assembly was then subjected to autoclaving at 135° C. for 60 min under a pressure of 200 psig (14.3 bar) in an air autoclave. The air inside the autoclave was cooled without admitting any additional air into the autoclave. After 20 min of cooling (or when the air temperature was less than about 50° C.), the excess pressure was vented and the vacuum bag containing the laminated assembly was removed from the autoclave. The vacuum was then released from the vacuum bag. The resulting laminate was removed from the vacuum bag, and the glass cover sheet was removed from the final laminate.

The laminates were subjected to ballistic testing according to European Standard EN 1063, Level BR4, the conditions of which are listed below:
 Type of Weapon: hand gun;
 Calibre: 0.44 Remington Magnum;
 Type of Bullet: full copper alloy jacket, flat nose, soft core (lead);
 Mass of Bullet: 15.6+0.1 g;
 Test Range: 5.00+0.5 m;
 Bullet Velocity: 440+10 m/s;
 Number of Strikes: 3; and
 Striking Distance: 120+10 mm.
The results of the ballistic tests are set forth in Table 3.

TABLE 3

| Sample | Layer 1 | Layer 2 | Layer 3 | Layer 4 | Layer 5 | Layer 6 | Layer 7 | Total Thickness (mm) | Areal Density (kg/m$^2$) | Ballistic Test Result |
|---|---|---|---|---|---|---|---|---|---|---|
| CE3 | Glass[1] (8 mm) | PVB[2] (0.76 mm) | Glass[1] (8 mm) | Polyurethane (1.9 mm) | Polycarbonate (2.5 mm) | | | 20 | 43.3 | Fail |
| E4 | Glass[1] (6 mm) | Ionomer[3] (1.5 mm) | Glass[1] (6 mm) | Ionomer[3] (6 mm) | Glass[1] (2.5 mm) | PVB[2] (1.52 mm) | PET[4] (0.18 mm) | 23.3 | 43.5 | Pass |
| E5 | Glass[1] (6 mm) | Ionomer[3] (1.5 mm) | Glass[1] (6 mm) | Ionomer[3] (4.5 mm) | Glass[1] (2.5 mm) | PVB[2] (1.52 mm) | PET[4] (0.18 mm) | 21.6 | 42 | Fail |
| E6 | Glass[1] (6 mm) | Ionomer[3] (1 mm) | Glass[1] (6 mm) | Ionomer[3] (5 mm) | Glass[1] (2.5 mm) | PVB[2] (1.52 mm) | PET[4] (0.18 mm) | 20.9 | 41.1 | Pass |
| E7 | Glass[1] (6 mm) | Ionomer[3] (1 mm) | Glass[1] (6 mm) | Ionomer[3] (6 mm) | Glass[1] (2.5 mm) | PVB[2] (1.52 mm) | PET[4] (0.18 mm) | 21.8 | 42.1 | Pass |

Notes for Table 3:
[1] Annealed glass;
[2] A Butacite ® poly(vinyl butyral) sheet commercially available from E.I. du Pont de Nemours and Company of Wilmington, Delaware;
[3] Ionomer resin used in Example E3;
[4] A Melinex ® film (0.18 mm thick), commercially available from DuPont Teijin Films, which was primed on one side with a poly(allyl amine) based primer as described in U.S. Pat. No. 7,189,457 and on the other side coated with an abrasion resistant hardcoat as described in European Patent No. 157030.

While certain of the preferred embodiments of this invention have been described and specifically exemplified above, it is not intended that the invention be limited to such embodiments. Various modifications may be made without departing from the scope and spirit of the invention, as set forth in the following claims.

What is claimed is:

1. A composition comprising an ionomer blend, said ionomer blend comprising, based on the total weight of the ionomer blend, about 5 to about 95 wt % of a first ionomer and about 95 to about 5 wt % of a second ionomer, said ionomer blend having a neutralization level of 10% to 90%, based on the total number of neutralized and unneutralized carboxylic acid groups in the ionomer blend, wherein:

(A) said first ionomer is the neutralization product of a first precursor acid copolymer; and i) the first precursor acid copolymer comprises copolymerized units of ethylene and further comprises about 20 to about 30 wt %, based on the total weight of the first precursor acid copolymer, of copolymerized units of a first α,β-ethylenically unsaturated carboxylic acid selected from the group consisting of acrylic acid and methacrylic acid; ii) the first precursor acid copolymer has a melt flow rate of about 70 to about 1000 g/10 min; and iii) the first precursor acid copolymer, being neutralized to a level of about 40% to about 90% based on the total number of the carboxylic acid groups present in the first precursor acid copolymer, produces a sodium ionomer, said sodium ionomer comprising carboxylate groups and counterions, said counterions consisting essentially of sodium cations; and wherein said sodium ionomer has a melt flow rate of about 0.7 to about 25 g/10 min and a freeze enthalpy that is not detectable or that is less than about 3.0 j/g, when determined by differential scanning calorimetry (DSC) in accordance with ASTM D3418;

(B) said second ionomer is the neutralization product of a second precursor acid copolymer, wherein i) the second precursor acid copolymer comprises copolymerized units of ethylene and about 18 to about 30 wt %, based on the total weight of the second precursor acid copolymer, of copolymerized units of a second α,β-ethylenically unsaturated carboxylic acid selected from the group consisting of acrylic acid and methacrylic acid; the second α-olefin is the same as or different from the first α-olefin; wherein the amount of ethylene in the second precursor acid copolymer is the same as or different from the amount of ethylene in the first precursor acid copolymer; the second α,β-ethylenically unsaturated carboxylic acid is the same as or different from the first α,β-ethylenically unsaturated carboxylic acid; and the amount of the second α,β-ethylenically unsaturated carboxylic acid is the same as or different from the amount of the first α,β-ethylenically unsaturated carboxylic acid; ii) the second precursor acid copolymer has a melt flow rate of about 60 g/10 min or less; and iii) the second ionomer has a melt flow rate of about 10 g/10 min or less at the neutralization level of the ionomer blend; and the melt flow rate of the second ionomer at the neutralization level of the ionomer blend is different from the melt flow rate of the first ionomer at the same neutralization level; and (C) the melt flow rates are determined in accordance with ASTM method D1238 at a polymer melt temperature of 190° C. and under a weight of 2.16 kg.

2. The composition of claim 1, wherein the first precursor acid copolymer has a melt flow rate of about 150 to about 400 g/10 min and the second precursor acid copolymer has a melt flow rate of about 30 g/10 min or less.

3. The composition of claim 1, wherein the first precursor acid copolymer comprises about 20 to about 25 wt % of copolymerized units of the first α,β-ethylenically unsaturated carboxylic acid; and wherein the second precursor acid copolymer comprises about 20 to about 25 wt % of copolymerized units of the second α,β-ethylenically unsaturated carboxylic acid.

4. The composition of claim 1, wherein the neutralization level of the ionomer blend is from about 15% to about 70%, wherein the ionomer blend comprises carboxylate groups and cations, and wherein the cations consist essentially of sodium cations.

5. The composition of claim 1, wherein, at the neutralization level of the ionomer blend, the first ionomer has a melt flow rate of about 0.7 to about 10 g/10 min and the second ionomer has a melt flow rate of about 5 g/10 min or less.

6. The composition of claim 1, wherein the ionomer blend comprises about 60 to about 95 wt % of the first ionomer and about 5 to about 40 wt % of the second ionomer.

7. An article comprising or produced from the composition of claim 1.

8. The article of claim 7, which is in the form of a film or a sheet or a molded article.

9. The article of claim 8, which is a film or sheet prepared by a process selected from the group consisting of dipcoating, solution casting, lamination, melt extrusion, blown film, extrusion coating, and tandem extrusion coating.

10. The article of claim 8, which is a molded article prepared by a process selected from the group consisting of compression molding, injection molding, extrusion molding, and blow molding.

11. The article of claim 10, which is an injection molded article.

12. The article of claim 11, having a minimum thickness of at least about 3 mm.

13. The article of claim 11, wherein the injection molded article has a multi-layer structure having at least one layer that consists essentially of the composition recited in claim 1, said at least one layer having a minimum thickness of at least about 3 mm.

14. The article of claim 13 that is a container.

15. The article of claim 11 that is a sheet, a container, a cap or stopper, a tray, a medical device or instrument, a handle, a knob, a push button, a decorative article, a panel, a console box, or a footwear component.

16. The article of claim 15 that is a container.

17. The article of claim 11, which is produced by a process selected from the group consisting of co-injection molding; over-molding; injection blow molding; injection stretch blow molding and extrusion blow molding.

18. An article prepared by injection molding, said article consisting essentially of the composition of claim 1 and having a thickness of about 1 to about 100 mm.

19. The composition of claim 1, wherein the ionomer blend is produced by a process comprising the steps of:
 a. providing the first ionomer;
 b. providing the second ionomer; and
 c. blending the first ionomer with the second ionomer.

20. An article comprising or produced from the ionomer blend composition of claim 19.

* * * * *